US010881968B2

(12) United States Patent
Baazov et al.

(10) Patent No.: US 10,881,968 B2
(45) Date of Patent: *Jan. 5, 2021

(54) SYSTEMS AND METHODS FOR CONDUCTING FANTASY CONTESTS

(71) Applicant: Fantech Software Inc., Saint-Laurent (CA)

(72) Inventors: Ofer Baazov, Saint-Laurent (CA); Michael Brooks, North Vancouver (CA)

(73) Assignee: Fantech Software Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,001

(22) Filed: Jan. 10, 2019

(65) Prior Publication Data

US 2019/0143225 A1    May 16, 2019

Related U.S. Application Data

(63) Continuation of application No. 15/555,857, filed as application No. PCT/CA2016/050588 on May 25, 2016, now Pat. No. 10,220,321.

(Continued)

(30) Foreign Application Priority Data

Oct. 14, 2015    (CA) ...................................... 2908292

(51) Int. Cl.
*A63F 13/828*    (2014.01)
*A63F 13/00*    (2014.01)
(Continued)

(52) U.S. Cl.
CPC ............ *A63F 13/828* (2014.09); *A63F 13/00* (2013.01); *A63F 13/35* (2014.09); *A63F 13/46* (2014.09);
(Continued)

(58) Field of Classification Search
None
See application file for complete search history.

(56) References Cited

U.S. PATENT DOCUMENTS

| 6,371,855 B1 | 4/2002 | Gavriloff |
| 8,814,660 B2 | 8/2014 | Thompson |

(Continued)

FOREIGN PATENT DOCUMENTS

| WO | WO 2014-014492 A2 | 1/2014 |
| WO | WO 2016-191860 A1 | 12/2016 |

OTHER PUBLICATIONS

International Search Report and Written Opinion, PCTCA2016/050588 as prepared by the Canadian Intellectual Property Office as the Searching Authority, dated Sep. 2, 2016, 17 pgs.

(Continued)

*Primary Examiner* — Ronald Laneau
(74) *Attorney, Agent, or Firm* — Adsero IP

(57) ABSTRACT

The present invention provides methods and system of identifying and communicating optimal fantasy sports pick (s). The methods comprise receiving, from one or more individual user(s), requests for entry into a contest; accepting said requests for entry into said contest; initiating said contest; and awarding prizes based on said ranking of users at the end of the contest.

6 Claims, 3 Drawing Sheets

Related U.S. Application Data

(60) Provisional application No. 62/240,695, filed on Oct. 13, 2015, provisional application No. 62/169,730, filed on Jun. 2, 2015.

(51) Int. Cl.
*A63F 13/35* (2014.01)
*A63F 13/46* (2014.01)
*G07F 17/32* (2006.01)

(52) U.S. Cl.
CPC ...... *G07F 17/3209* (2013.01); *G07F 17/3244* (2013.01); *G07F 17/3272* (2013.01); *G07F 17/3288* (2013.01)

(56) References Cited

U.S. PATENT DOCUMENTS

| | | |
|---|---|---|
| 8,821,291 B2 | 9/2014 | Callery et al. |
| 8,926,436 B2 | 1/2015 | Sloan et al. |
| 8,944,905 B2 | 2/2015 | Odom et al. |
| 10,220,321 B2 | 3/2019 | Baazov et al. |
| 2008/0281444 A1 | 11/2008 | Krieger et al. |
| 2011/0319171 A1 | 12/2011 | Ngozika |
| 2013/0324228 A1 | 12/2013 | Barber |
| 2014/0031105 A1 | 1/2014 | Givant |
| 2015/0011298 A1 | 1/2015 | Haid et al. |
| 2015/0375117 A1* | 12/2015 | Thompson .............. A63F 13/35 463/9 |
| 2017/0021281 A1* | 1/2017 | Fanning ................ A63F 13/828 |
| 2017/0072321 A1* | 3/2017 | Thompson ......... H04N 21/2358 |
| 2018/0071637 A1 | 3/2018 | Baazov et al. |
| 2019/0022535 A1* | 1/2019 | Evans ................... A63F 13/828 |

OTHER PUBLICATIONS

International Preliminary Report on Patentability, PCTCA2016/050588 as prepared by the International Bureau, dated Dec. 5, 2017, 9 pgs.

Canadian Application No. 2,945,429, Office Action dated Sep. 29, 2017, 7 pgs.

U.S. Appl. No. 15/555,857 NonFinalOA dated May 11, 2018, 18 pages.

U.S. Appl. No. 15/555,857 Notice of Allowance dated Oct. 15, 2018, 20 pages.

* cited by examiner

FIG. 1

continued

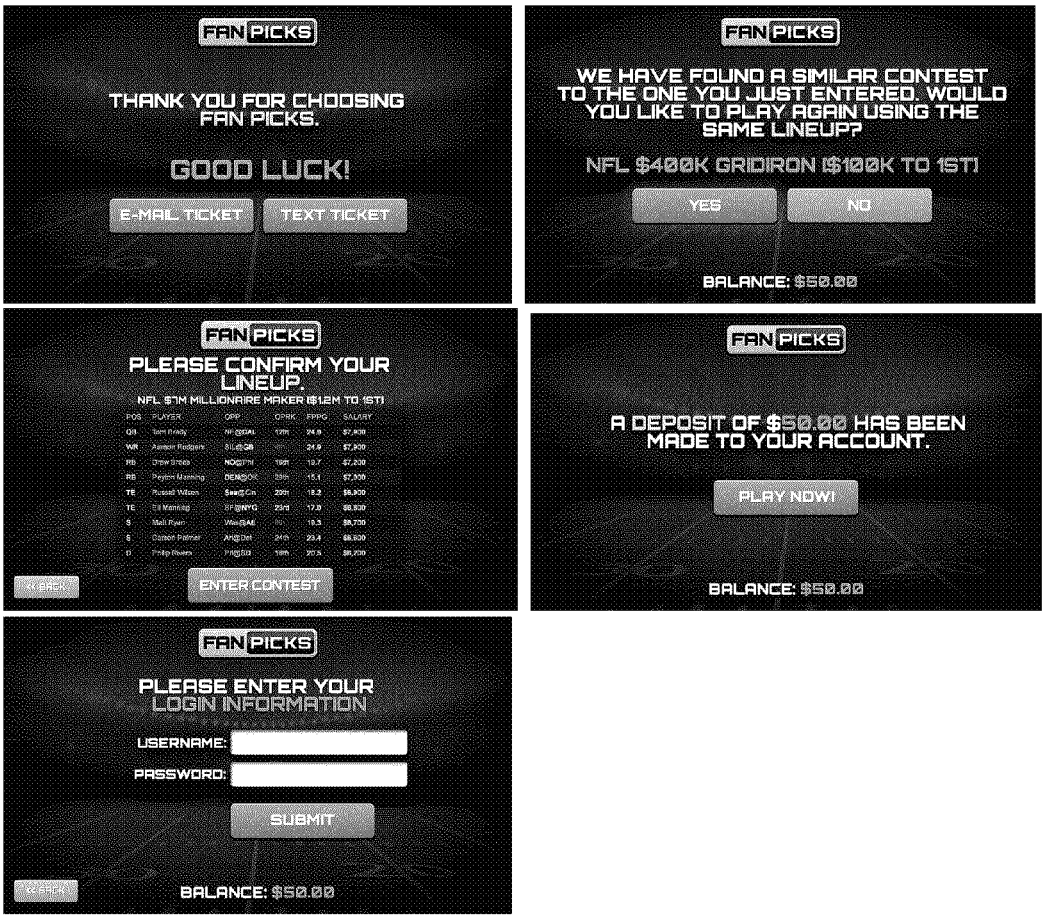

SYSTEMS AND METHODS FOR CONDUCTING FANTASY CONTESTS

CROSS-REFERENCES TO RELATED APPLICATIONS

This application is a continuation of U.S. patent application Ser. No. 15/555,857 filed Sep. 5, 2017, by Ofer Baazov et al. and titled, "Systems and Methods for Conducting Fantasy Contests", which is a 35 U.S.C. § 371 national phase application of PCT/CA2016/050588 (WO 2016/191860 A1), filed on May 25, 2016, entitled "Systems and Methods for Conducting Fantasy Contests," which claims the benefit of Canadian Application No. 2,908,292, filed Oct. 14, 2015, U.S. Provisional Application No. 62/240,695, filed Oct. 13, 2015, and U.S. Provisional Application No. 62/169,730, filed Jun. 2, 2015, the teachings of which are incorporated herein by reference in their entirety for all purposes.

BACKGROUND

Fantasy sports league games are well known. Generally, in such games, participants select or "draft" currently active real-life athletes to form fantasy teams. A participant's success or failure in the game corresponds to the performance of the players in real-life games. Fantasy sports leagues can be of varying duration including daily, weekly or seasonal and may include both paid and free contests. Prizes, including monetary prizes, are awarded based on performance of the participants' fantasy team.

In 2014, according to the Fantasy Sports Trade Association, there were over 41 million people playing online fantasy sports in North America with each player spending, on average, $111 over a 12-month period. Examples of online fantasy sports leagues include but are not limited to Fanpicks.com; Fanduel.com and Draftkings.com.

U.S. Pat. No. 8,821,291 teaches methods of conducting fantasy sports or other competitions, where users select or draft an entirely new team of professional players each week (or at other suitable time interval).

U.S. Pat. No. 6,371,855 teaches a system for providing an interactive sports game to a plurality of participants wherein each participant wishes to form a fantasy sports team made up of actual players.

U.S. Pat. No. 8,814,660 teaches a fantasy betting application operated on a computerized device for managing a bet relating to statistics of a sporting event.

WO2014014492 teaches systems and methods for conducting fantasy sports tournaments.

U.S. Pat. No. 8,926,436 teaches a method and device for fantasy sports roster recommendations.

U.S. Pat. No. 8,944,905 teaches methods for direct wagering and lottery wagering on real-world events including outcomes based on fantasy sports league performance.

SUMMARY OF THE INVENTION

An object of the present invention is to provide systems and methods for conducting fantasy contests. In accordance with an aspect of the present invention there is provided a method of identifying and communicating optimal fantasy sports pick(s), said method comprising:
  a) receiving, by a server computing device, from a user computing device, user information provided by an individual user, wherein the use information includes sport(s) of interest;
  b) retrieving information regarding said sport(s) of interest, by the server computing device, from one or more fantasy sports website(s);
  c) determining from said information one or more optimal fantasy sports pick(s) for each of said one or more fantasy sports website(s), wherein said determination takes into account one or more of the following:
    i) historical performance statistics for the athletes;
    ii) salary cap of each sports fantasy website for each sport;
    iii) player value that is assigned to each athlete by each sports fantasy website;
    iv) scoring rules for each sport for each sports fantasy website; and
    v) roster specifications sports fantasy website; and
  d) communicating, by the server computing device, to the user computing device one or more optimal fantasy sports pick(s) for each of said one fantasy sports website(s).

In accordance with another aspect of the invention, there is provided a method of conducting a fantasy sports contest, said method comprising:
  a) receiving requests for entry into a fantasy sports contest; wherein said entry into said fantasy sports contest includes one or more fantasy sports pick(s) and optionally an entry fee;
  b) accepting the requests for entry into said fantasy sports contest;
  c) initiating said fantasy sports contest;
  d) determining sell value of the entry for each of said one or more individual user(s), wherein said determination takes into account one or more of the following:
    i) historical data on the players included in the entry;
    ii) current performance of the players in the individual user's entry and other users' entries;
    iii) historical data on the average value per fantasy point of all entries;
    iv) current happenings during the sport contest;
    v) the amount of the entry fee;
    vi) amount of the prize pool;
    vii) individual amounts of each prize in the contest;
  e) communicating the sell value of the entry and offering the sell value to the individual user which owns said entry;
  f) receiving acceptances and/or refusals of said offer(s) to each of said one or more individual user(s); (the offer for purchase may be made by the contest organizer or by a third party such as another user)
    determining final value of entry for each of remaining individual user(s), wherein said determination is based on the user's rank in the contest as compared to other users;
  g) awarding prize to each remaining individual user(s).

In accordance with another aspect of the invention, there is provided a method of conducting a fantasy sports contest, said method comprising:
  a) receiving from one or more individual user(s), requests for entry into a fantasy sports contest; wherein said entry into said fantasy sports contest includes a set of fantasy sports pick(s) and optionally an entry fee, wherein each pick of said set of fantasy sports picks is selected from a pair of predetermined picks,
  b) accepting the requests for entry into said fantasy sports contest; initiating said fantasy sports contest;
  c) determining points for each individual user based on the set of fantasy sports picks; wherein points are awarded based on outcome of each pick; and d) awarding prizes based on a ranking individual user(s) based on total number of points and/or a points threshold.

In accordance with another aspect of the invention, there is provided a method of conducting a fantasy competition contest, said method comprising:
  a) receiving, from one or more individual user(s), requests for entry into a fantasy competition contest; wherein said entry into said fantasy competition contest includes a set of fantasy competition pick(s), wherein each pick of said set of fantasy competition picks is selected from one or more types of competitions and optionally an entry fee;
  b) accepting said requests for entry into said fantasy competition contest;
  c) initiating said fantasy competition contest;
  d) determining points for each individual user based on the set of fantasy competition picks; wherein points are awarded based on outcome of each pick; and
  e) awarding prizes based on a ranking individual user(s) based on total number of points and/or a points threshold.

In accordance with another aspect of the invention, there is provided a method of managing multiple fantasy sports contests to maximize prize payout, said method comprising:
  a) receiving a request for entry into multiple fantasy sports contests; wherein said entry into said multiple fantasy sports contests includes (i) a set of fantasy sports pick(s) and optionally (ii) entry fee; for each of fantasy sports contest,
  b) accepting said request for entry into said multiple fantasy sports contests;
  c) initiating said fantasy sports contests;
  d) determining outcome for the user for each of said fantasy contests; and
  e) awarding prizes based on said outcome of all of said multiple fantasy contests, wherein a prize is awarded only if user meets predetermined outcome for each of said multiple fantasy contests.

In accordance with another aspect of the invention, there is provided a method of conducting a fantasy sports contest, said method comprising:
  (a) receiving from an individual user a request for entry into a fantasy sports contest; wherein said entry into said fantasy sports contest includes entry fee and a set of fantasy sports pick(s),
  (b) accepting said request for entry into said fantasy sports contest;
  (c) initiating said fantasy sports contest;
  (d) determining points for the user based on the set of fantasy sports picks; wherein points are awarded based on outcome of each pick;
  (e) comparing said points to a pre-determined payout chart; and
  (f) awarding prizes based on said pre-determined payout chart. Optionally, the payout chart may be partially or primarily determined by users' relative past performances in similar contests.

In accordance with another aspect of the invention, there is provided a method of conducting a contest, said method comprising:
  a) receiving, from one or more individual user(s), requests for entry into a contest; wherein said entry into said contest includes a set of answer(s) to one or more question(s) and optionally an entry fee;
  b) accepting said requests for entry into said contest;
  c) initiating said contest;
  d) determining points for each individual user based on the set of answers; wherein points are awarded based on outcome of each answer; and
  e) awarding prizes based on a ranking individual user(s) based on total number of points and/or a points threshold.

Definitions

For the purposes of the present disclosure the term "fantasy sports" is contemplated to include any competition with imaginary teams which the participants own and/or manage and with the games based on information (including but not limited to statistics) generated by actual competitors, players or teams of one or more amateur or professional sport(s) or other competitions (including but not limited to political races, awards shows, games, sporting competitions, skill competitions, social media or financial securities including but not limited to stocks, bonds, commodities, currencies, indexes, mutual funds or real estate).

In certain embodiments, the size of the fantasy sports teams may be limited by a pre-determined salary cap where the salary of each potential selection has been pre-determined and is optionally based on past performance of the selection). In embodiments in which there is a salary cap, the user at the start of the contest drafts players and the total cost of the players on the user's team cannot exceed the salary cap. In other embodiments, the user is not restricted by salary cap constraints. In certain embodiments, the potential selections do not have a salary value attached to them; rather each potential selection has a point spread value attached to them. The point spread may be negative, positive, or zero.

The fantasy sports contests may be limited to a single type of competition (such as a single type of sport) or multiple types of competitions (such as multiple types of sports and/or other types of competitions). The fantasy sports contests include both fee based and free contests. The fee based and free contests may operate in substantially the same manner with the exception that each fee based contests has a pre-determined entry fee.

The contests may be of varying length, including part of an event (such as one or more portions of an event including for example one or more periods, innings, quarters or half (In such cases, the start time of the contest may be either at the beginning of the event or after the event has started; non-limiting examples include: kickoff of a football game: 1st period puck drop of a hockey game; beginning of 2nd quarter of a football game; beginning of 2nd half of a football game; beginning of a baseball game; beginning of the 4th quarter of a basketball game. Likewise, the end time of such contests could be at the end of the event or prior to the end of the event; non-limiting examples include: end of the 1st quarter of a football game; end of 2nd period of a hockey game; end of the 5th inning of a baseball game; end of the 3rd quarter of a basketball game), single event (such as a single game), multiple events (such as multiple games), day, multiple days, week, multiple weeks, monthly, seasonal (including full season or partial seasons, such as playoffs or championships), multi-season or year. The contests may have unique time periods as well, including but not limited to any contest from minutes to days or weeks. Alternatively, the contest may be run without a time period. In such instances, the contest may end when a pre-determined value is reached.

Prizes including monetary and non-monetary prizes (such as merchandise or gift cards) may be awarded. In fee based contests, the total prize pool may be fixed by the contest organizer prior to the start of the contest or determined based on total number of entries. For example, the prize pool may be a percentage of the total entry fees collected. Individual prizes may be awarded based on ranking against other users, a predetermined prize chart, a point threshold or a combination thereof. Optionally, prizes may also be partially based on past performance of the user. In particular, a determination of whether a prize will be awarded is based on ranking against other users and the choice of potential prizes may be based on past performances of all (or a subset of that group) users. The contests may include a single prize pool or a primary prize pool and supplemental prize. The prize pool(s) may be fixed or may increase with each repetition of the contest until it is won.

For the purposes of the present disclosure, the term "sports" includes any type of amateur or professional sport or athletic event, including but not limited to football, soccer, baseball, basket ball, golf, hockey, boxing, mixed martial arts, Olympic events, skiing, cycling, curling, racing including but not limited to car, motorcycle, boat, horse and greyhound. In addition, for the purposes of the present disclosure, sports may include other competitions including political races, reality shows, awards shows, games, judged competitions and skills competitions.

In certain embodiments, the "team" or "roster" of the contest is a roster of financial securities. Securities choices may be assigned a salary value or a point spread (for non-salary cap contests) based on historical performance of the stock and current market or industry conditions. In such embodiments, a user (client) picks a roster of financial securities, including but not limited to stocks, bonds, commodities, currencies, indexes, mutual funds or combinations thereof, in a contest against other users. The format of the roster or team can include various roster structures. For example, the roster may be limited by industry (technology, oil, service, healthcare, financial, etc.), cap (small cap, mid cap, large cap), volume (high activity vs low activity), other characteristics (blue chip, penny), exchange traded on, or given a utility/flex position where securities selections are not limited. Scoring of such contests may include but is not limited to scoring based on percentage change in price over the contest period; scoring based on ticks over the contest period; separate scoring systems for different roster positions (blue chip versus penny stock); scoring based on simply how many stocks in roster increased/decreased in value without basis on the size of the increase/decrease.

In certain embodiments, the "team" or "roster" of the contest is an active social media users. For example, the roster may be limited by social media site (facebook, twitter, instagram, pinterest, etc.), industry (actor, sports, politician, etc.), volume (high follower base vs low follower base), or given a utility/flex position where selections are not limited. The pool of available picks may be limited by volume of users, popularity, social media activity, or other factors. Scoring of such contests may include but is not limited to scoring based on likes, comments, shares, new followers, retweets, pins and/or views.

For the purposes of the present disclosure, the term "user device" includes but is not limited to a personal computer, smartphone, tablet, wearable mobile device technology, KIOSK devices and POS devices, among any other arrangement that will be readily understood by the skilled person.

BRIEF DESCRIPTION OF THE FIGURES

FIG. 1 illustrates various screens of various embodiments of the device of the invention.

DETAILED DESCRIPTION

The present invention relates to computer implemented systems and methods of conducting, managing and/or optimizing fantasy competitions, such as fantasy sports competitions. A worker skilled in the art would appreciate that the computer implemented methods and systems of the present invention allow for a large number of people in various locations (including worldwide) to participate in fantasy sports contests in real-time.

An exemplary system for conducting the fantasy contests of the present invention includes one or more user devices which communicate via a network to a server computing device. The server computing device optionally further communicates via the network with one or more databases.

The one or more user devices includes but is not limited to a personal computer, smartphone, tablet, wearable mobile device technology, kiosks (such as a lottery kiosk), among any other arrangement that will be readily understood by the skilled person. The one or more user devices each include software (e.g., operating system, Internet browser, fantasy competition mobile application software (i.e. app) etc.) to communicate with the computing device, and sufficient processing and storage capabilities to effectively execute the software. The one or more user devices may utilize any of the major platforms (e.g., Linux, Macintosh, Unix, OS2, Windows, etc.).

The one or more user devices communicate with the server computing device via a network. The server computing device receives and implements requests from the one or more user devices, under software control, for conducting the methods of the present invention described in detail below. A worker skilled in the art would readily appreciate appropriate server computing devices. Such a worker would readily appreciate that appropriate server computing devices comprise software (for example operating system, server software, fantasy contest software, etc.) to communicate with the one or more user devices and process requests; and appropriate components (e.g., processor, disk storage or hard drive, etc.) having sufficient processing and storage capabilities to effectively execute the server and fantasy contest software. The server computing device optionally includes one or more databases. The server computing device may utilize any of the commercially available operating systems and/or server software. A worker skilled in the art would readily appreciate that the server computing device may comprise a plurality of computing devices cooperating to perform the functions described herein or cloud based.

A worker skilled in the art would readily appreciate appropriate networks for use with the present invention. Non-limiting examples of appropriate networks include internet, WAN, LAN, Intranet, etc.). The one or more user devices and server computing devices may be local to or remote from each other.

In certain embodiments, there is provided user devices to operate the methods of the invention. These devices may be at public or private locations. These locations include but are not limited to land based locations such as lounges, bars, restaurants, clubs and similar type locations. The locations may also include modes of transportation such as ships, including but not limited to cruise ships or ferries, buses or taxis. A worker skilled in the art would readily appreciate that the device may be tailored to the specific type of location. For example, a tablet form of the device may be implemented in bars, including but not limited to sports bars, lounges including but not limited to casino lounges and sportsbooks; a kiosk product may be implemented in bars, including sports bars, sportsbooks and casinos; a point of sale (POS)/lottery terminal may be implemented in lottery kiosk booths (such as those found in shopping malls); convenience stores or gas stations.

Such devices may allow for anonymous use and/or account-based use. In certain embodiments of the anonymous iteration, users may begin play on the device without logging on by selecting one or more contests to play; selecting one or more types of notifications from the system; and optionally selecting payment options (if the contests require an entry fee). Types of notifications from the system include but is not limited to SMS/text messaging options and email options. In certain embodiments, the user receives a confirmation number or bar code, receipt or ticket, such a ticket allows the user to access the system at a later date to for example check results of the contest, modify the contest, add funds, check balance of funds associated with the contest and/or play subsequent contests. For example, the user may access the system by scanning the ticket or entering in the barcode at a system device. For pay contests, a variety of payment methods are contemplated including but not limited to giving cash to a cashier staff member of the establishment, via credit card and via online e-wallet such as Paypal.

In certain embodiments, there is also provided a network of sites running a common contest within the network. In this embodiment, the common contest includes participants from all participating network sites and those users play against each other with all entered users being eligible for prize payouts.

Methods

In one embodiment of the present invention, there is provided a method of identifying and communicating optimal selection(s) of a pick(s) for one or more fantasy competition(s), such as player selections for fantasy sports contest. The method comprises the following steps: (a) Receiving, by a server computing device, from a user device, user information provided by an individual user. The user information may include competitions(s) of interest. The competition(s) of interest may be from any type of competition, including but not limited to any sport of interest including amateur and professional sports, team and individual sports, league sports and individual events; awards; reality show contests, political races; games and skills based competitions. The user information may also include but is not limited to one or more of the following: personal information including for example one or more of the following: name, address, history of use including performance statistics and contacts. For entry fee based contests, user information may also include billing information, such as credit card information or online payment options. The user information may be linked to a password accessible secure account or directly entered into an user interface. The user interface may be a webpage and/or app. (b) Retrieving information regarding the competition(s) of interest, by the server computing device, from one or more website(s) and/or databases. The websites may include but are not limited to news sites including general news sites, specialty news sites such as sporting news sites, business news sites etc; fantasy sports sites online gambling sites; online trading or investment sites. (c) Determining from the information one or more optimal pick(s) for each of said one or more website(s) or databases and/or overall optimal picks. The determination of optimal picks may take into account one or more of the following: historical performance statistics for the potential pick(s) and/or the user. In the case of fantasy competitions, the optimal fantasy picks may be specific for each of said websites or databases (for example, for each of the one or more fantasy sports website(s)) or overall optimal pick(s). The determination may take into account historical performance statistics for the potential picks and, in the case of fantasy websites one or more of the following salary cap of each fantasy website for each competition; value that is assigned to each potential pick by each fantasy website; scoring rules for each competition for each fantasy website; and roster specifications fantasy website. (d) Communicating, by the computing device, to the user device one or more optimal pick(s). The communications may optionally include links to one or more websites. The one or more websites may be the one or more information website(s) and/or other websites. The methods may be automated such that optimal selections are determined on a regularly scheduled basis and then communicated to the user. The schedule may be time specific (for example daily, weekly or monthly) or may be event specific. The communications may be general, for example, an alert, pop-up or banner on a website (such as a fantasy contest website) or may be user specific, for example, in the form of alerts to the user each time the user enters their user information (or password) into the user interface and/or may communicated to the user on a regularly scheduled basis. The communications may include for example text messages, emails, pop-ups or other forms of notifications.

In certain embodiments, there is provided a method of managing a contest, such as a fantasy sports contest, which provides the entrant (user) one or more opportunities to cash-out or sell their entry. In certain embodiments, the method includes managing multiple contests and providing the entrant one or more opportunities to cash-out or sell one or more of their entries. Also provided is an opportunity to purchase entries which are for sale. The method comprises the following steps. Receiving request for entry into a fantasy contest, by a computing device, from a user device; wherein said entry into said fantasy contest includes entry fee and one or more fantasy pick(s). The request may be from a previously registered user or may be directly entered into an user interface, such as a webpage or app. Initiating said fantasy contest and determining a sell value of the entry for each user in the contest. The sell value determination may take into account one or more of the following: historical data on the picks included in the entry; current performance of the picks in the individual user's entry and other users' entries; historical data on the average value per fantasy point of all entries; current happenings during the sport contest; the amount of the entry fee; amount of the prize pool; individual amounts of each prize in the contest. The sell value of the entry is communicated to the user and an offer for purchase is made. The offer for purchase may be made by the contest organizer or by a third party such as another user. The communications may be in the form of alerts to the user each time the user enters their user information (or password) into the user interface and/or may communicated to the user on a regularly scheduled basis. The communications may include for example text messages, emails, pop-ups or other forms of notifications. Receiving acceptances and/or refusals of said offer(s) to each of said one or more individual user(s). The methods may be automated such offers to purchase are accepted or refused based on a pre-determined value. After a predetermined amount of time, the final value of each entry for each of remaining individual user(s) is determined. The predetermined amount of time may be any amount of time, such as hourly, daily, weekly, monthly or after a set number of events or portions thereof (for example, if the sports fantasy contest is based on a seasonal sports league, after a portion of the season). The determination of final value is based on the user's ranking in the contest as compared to the other users. The determination of sell value may be continuous during the duration of the contest or at set time periods. Following conclusion of the contest, prizing are awarded to the remaining user(s).

In certain embodiments, there is provided a method of conducting a fantasy contest where the user selects a number of picks from a limited pool of picks. The contest may be limited to a fantasy sports contest relating to one or more types of sports or may relate to one or more types competitions (including both sporting and/or non-sporting competitions). The method comprises the following steps. Receiving and accepting from one or more individual user(s), requests for entry into a fantasy contest. The request may be from a previously registered user or may be directly entered into an user interface. The request for entry includes a set of a specific number of fantasy pick(s). For example, the set may include 5, 10, 11, 12, 13, 14, 15 or more picks. Each pick of the selection of picks may be selected from a selection of predetermined picks, including but not limited to a pair of picks. The selection of predetermined picks may be the same or different for each of the picks. Alternatively, the set, as a whole may be picked from a selection of predetermined sets. The fantasy contest is then initiated and after a set period of time points are award to each individual user based on the performance of their set of fantasy picks. Each user is ranked based on number of points and prizes are awarded based on the ranking. In certain embodiments, prizes may be scaled depending upon the number of picks. In certain embodiments, the prize pool increases with each repetition of the contest. In certain embodiments, prizes are awarded by a pre-set prize table.

In certain embodiments, there is provided a method of conducting a fantasy contest in which the picks are selected from different competitions. This method allows for the inclusion of "one-off" events in a fantasy contest. The contest may be limited to a fantasy sports contest relating to two or more types of sports or may relate to two or more types competitions (including both sporting and/or non-sporting competitions). Each competition may be a "one-off" event (such as a single sporting event, awards show, political race or game) or a series of events (such as a sport tournament or series). The method comprises the following steps. Receiving and accepting from one or more individual user(s), requests for entry into a fantasy contest. The request may be from a previously registered user or may be directly entered into an user interface. The fantasy contest is then initiated and after a set period of time points are award to each individual user based on the performance of their set of fantasy picks. Each user is ranked based on number of points and prizes are awarded based on the ranking.

In certain embodiments, there is provided a method of managing multiple fantasy contests, such as fantasy sports contests, to maximize prize payout. The fantasy sports contests may be run concurrently or at different times, such as consecutively. Receiving a request for entry into multiple fantasy contests or a receiving a request to link one or more previously entered fantasy contests. The entry includes (i) entry and optionally a fee and (ii) a set of fantasy sports pick(s) for each of fantasy contest or an identification of previously entered fantasy contests. The request may be from a previously registered user or may be directly entered into an user interface. The outcome for the user for each of the fantasy contests is determined; and prizes are awarded based on the outcome of all of the multiple fantasy contests. A prize is awarded only if user meets predetermined outcome for each of said multiple fantasy contests.

In certain embodiments, there is provided a method of conducting a fantasy contest whereby payout is based on a pre-determined payout chart. The method comprises the following steps. Receiving and accepting from one or more individual user(s), requests for entry into a fantasy sports contest. The request may be from a previously registered user or may be directly entered into an user interface. The fantasy contest is then initiated and after a set period of time points are award to each individual user based on the performance of their set of fantasy picks. In particular points are awarded based on outcome of each pick and points are compared to a pre-determined payout chart. Points are awarded prizes based on the pre-determined payout chart.

In certain embodiments, there is provided a method of conducting a contest where a user selects answer(s) from a selection of answers to one or more questions. The question/answer format may include a variety of question/answer formats, including but not limited to yes/no; true/false; multiple choice; matching or a combination thereof. Exemplary questions include but are not limited to (1) question(s) regarding a specific performance (individual, group of individuals or team(s)) in a specific event (or portion thereof); (2) question(s) relating to comparative performances either between individuals or against a predetermined bench mark. Performance may be actual performance or performance in a "fantasy contest". The method comprises the following steps: Receiving and accepting from one or more individual user(s), requests for entry into a fantasy contest. The request may be from a previously registered user or may be directly entered into an user interface. The request for entry includes the answers to one or more questions. The questions may be standard questions for a particular contest (such as "questions of the day") or tailored to a specific user (for example, may be limited to specific areas of interest identified by the user, such as specific sports). The request for entry optionally includes an entry fee. The users answers are reviewed and scores are aware to each user based on each correct answer. Optionally prizes are awarded based on users score. For example, prizes may be based on a user's ranking compared to other users or a prize table.

In certain embodiments, one or more of the above methods may be combined. In certain embodiments, one or more of the above methods may be automated such that the contests are entered on a scheduled basis (for example, a subscription basis).

In certain embodiments, the methods of the invention provide an optional step to mitigate any unforeseen events which may impact the user's roster. Unforeseen events include for example a player not playing because of injury, illness or game cancellation. In certain embodiments, if an insured player on the user's roster does not start or scores minimal points, the system will either automatically replace that player with a similar priced player that does start or play or a previously chosen backup choice (made by user when choosing player insurance). Specific non-limiting examples include:

a lineup-wide player insurance where the insurance picks are made by the user in case any of their starting players do not play;

a position by position insurance where the user may pay the insurance premium per position, with the option of a backup of equal or lesser value in case the starter does not start;

a lineup-wide player insurance where the system automatically makes a replacement pick based on a given set of criteria built into the system in case the starter does not play;

a position by position insurance where the user may pay the insurance premium per position, and the system automatically makes a replacement pick based on a given set of criteria built into the system in case the starter does not play;

a lineup-wide player insurance where the user gets some amount of his entry fee back if a player does not start AND lineup does not place in the money.

In certain embodiments, the methods of the invention include an optional step which allows the user to select insurance when the user is selecting the roster. Alternatively, the methods of invention automatically include insurance. In certain embodiments, the methods of the invention include the insurance unless the user opts out. The insurance may be a free service, with a fixed charge or percentage of entry fee.

In certain embodiments, there is provided optional supplementary contests which may be fee based, may be a fixed fee or a percentage of the user's entry fee, or free to primary contest players. These contests may be open to all users or limited to users which did not win and/or place in the prizes in the primary contest. In certain specific embodiments, in order for the supplemental prizes to be awarded at least one user must meet predefined criteria in the primary contest. Such criteria include but is not limited to choosing the best player at certain positions in their roster but still not winning the contest/placing in the prizes and/or meeting a certain point threshold. In certain embodiments of such supplemental contests, the amount of the payout of the supplemental prize is dependent upon an user's placing in the contest. A non-limiting example includes the winner of the primary contest winning 20% of the supplemental prize, first eligible loser (i.e. user which lost primary contest but met the predefined criteria of the supplementary contest) winning 70% of the supplementary prize, and the 10% remaining of the supplementary prize is split between the rest of entrants or supplemental contest buy-ins). The prize pool in such supplementary contests may be a fixed pool, may be a cumulative pool which continues to aggregate with each repetition of the contest until a user meets the eligibility requirements.

In certain embodiments of the contests, the contest includes selection of picks from a group of options, points are awarded for each correct pick and prizes awarded based on number of points.

In certain embodiments of the contests, the prizes awarded may be based on ranking in the contest and/or meeting a predetermined criteria, such as a point threshold. In certain embodiments prizes are awarded based on ranking and additional prizes are awarded based to users which meet a point threshold. These point threshold prizes may be fixed or may be a cumulative pool which continues to aggregate with each contest until a user meets the eligibility requirements

EXAMPLES

Example 1: "Fantasy Predictor" Feed or Link

Overview:

The fantasy predictor is a display, meant to be viewed on a webpage or other platform which accesses the internet (such as a mobile application or television display which gathers information from the internet). The display will show optimal picks for various daily fantasy sports (DFS) websites' sports contests. The display will essentially look like a "grid". The user will be able to click and select which sport for which he would like to view picks, from a menu of available sports. The grid will feature as column headers the names of several sites, or possibly just one site. The row headers will be the various sports positions generally associated with the sport selected (such as C, RW, LW, D, G for hockey, or QB, RB, WR, TE, K, D for football). The information in the grid squares themselves will be the names of players that have been selected by a computer program as "optimal" picks for the specified sport for a particular site for that day or week. Some notes below the grid will be presented to provide further analysis of the predictions. A final version will likely display also the salary cap of each site/sport and the assigned player values of the athletes. The notes will be written daily by a writer and are not based solely on the computer predictions. A non-graphic example of what a grid might comprise is below:

| Fantasy Sports Daily Predictor | | |
|---|---|---|
| Site 1.com | Site 2.com | Site 3.com |
| G: Roberto Luongo Fla | G: Roberto Luongo Fla | G: Carey Price MTL G: Devan Dubnyk Min |
| RW: Max Pacioretty Mtl | RW: Alex Ovechkin Was | RW: Max Pacioretty Mtl |
| C: Henrik Sedin Van | C: Henrik Sedin Van | C: Henrik Sedin Van |
| LW: Evgeni Malkin Pit | LW: Evgeni Malkin Pit | LW: Evgeni Malkin Pit |
| D: Erik Karlsson Ott | D: PK subban MTL | D: Willie Mitchell Fla |
| D: John Muzzin LA | D: John Muzzin LA | D: Slava Voynov LA |
| D: Zdeno Chara Bos | D: Zdeno Chara Bos | D: Zdeno Chara Bos |
| Flex: Tomas Hertl SJ | Flex: Tomas Hertl SJ | Flex: Tomas Hertl SJ |
| Flex: Bo Horvat Van | Flex: Shawn Matthias Van | Flex: Shawn Matthias Van |
| Flex: Filip Forsberg Nas | | Flex: Filip Forsberg Nas |

Our Analytics Computer Says:

Roberto Luongo is always strong at home in April

John Muzzin is hot and undervalued on most sites

Tomas Hertl is on SJ PP1 and has put the sophomore slump behind him

Zdeno Chara should not be bothered by the NYI undersized forwards

Filip Forsberg will be rookie of the year and the computer will not argue against Henrik Sedin is always a bargain against the Oilers Compute big numbers for the "offensive" D-men Karlsson and Subban tonight.

Functionality:

The display will be refreshed once per day, typically in the morning. The display will be made available to various websites or other web content distributors for purposes of providing desirable fantasy sports content on their sites. The predictor grid might be available by a feed process such as XML or JSON, by a link/frame process, or by any other suitable method whereby the product is displayed elsewhere on the internet. The end user (the user accessing the internet, viewing the display), after choosing a sport(s) and viewing the predicted information, may click one of several links embedded in the product to be redirected to a website(s) where they may sign up and play various fantasy sports games.

Business Model:

The most likely business model (affiliate model) will be to offer the product to web content providers for display on their sites, gratis. The web content provider would earn a % of revenue derived from users play on the end website after redirection. Users would be "tagged" with a cookie as they clicked through the product, thereby assigning the user to the specific web content provider, hence allowing for accurate reporting on these revenue amounts.

Objectives:

Primary business objectives are:
- To drive traffic to one or more websites, where the end user may choose to sign up and participate in free or cash contests, thereby producing revenue for the site(s)
- To expose the end website brand to many web users that match the desired demographic for the DFS market.
- To produce a product that should be in high demand by DFS web content providers, thereby increasing the inherent value of the predictor product for possible future sale, licensing, or other usage.

Process:

The predictor will utilize a feed of historical sports data provided by a $3^{rd}$ party, and will take into account the following variables:
- various historical performance statistics for the athletes
- the "salary cap" of each website for each sport (commonly available)
- the "player value" that is assigned to each athlete each morning by each site (commonly available)
- the "scoring rules" for each sport for each website (commonly available)
- the "roster specifications" (the amount of each type of player a user must pick) for each site (commonly available)
- a mathematical formula(e), formulated by a mathematician(s) who specialize in DFS analytics.

Example 2: "the Guarantee" Guaranteed Cashout Entry

Overview:

"The Guarantee" is a function within a fantasy gaming system, whereby a user who has entered a contest has the ability to "cash out" or "sell" their entry back to the system administrator (or another real user) at any time during a contest. A method of determining the entry cash value would be established by system administrator and the value (possibly minus a certain percentage) would be displayed to the user throughout the contest on the contest lobby of the website or mobile device. If the user does sell the ticket, then the A chronological example is given below:
- Player A enters an NBA contest for an entry fee of $10. There are 9 other contestants/entries and the total prize pool is $91 (or 91% of the total entry fees).
- Contest begins
- At this point a chance to sell the ticket back for $8.80 is displayed to the user (the entry is now worth $9.10 and we are offering slightly less)
- The user declines to sell, and now the user's entry starts to do very well in relation to the other entries. Now a value of $15.80 for the entry is displayed to the user and the user has the option to sell.
- The user declines to sell, and now his team starts to do very poorly. The system administrator offers to buy the ticket for $4.30.
- At this point the user decides to sell the ticket and receives $4.30.
- The entry, now owned by system administrator (or possibly by another real user) ends up coming in third and winning a prize of $15. System administrator (or user who bought the ticket) would collect the $15. The original user who made the entry would still receive just $4.30 regardless of the final position of his entry.

Functionality/Process:

A method of valuing the price of a contest entry continually during a fantasy contest will be developed. The valuation method might take into account some or all of the following:
- Historical data on the players included in the entry (and competitor entries)
- The current performance of the players in the contest entry (and competitor entries)
- Historical data on the average value per fantasy point of all entries
- Current happenings during the sport contest (player may become injured, player may be put on the bench, weather conditions etc)
- The amount of the entry fee
- The amount of the prize pool
- The individual amounts of each prize in the contest
- A way to offer the cashout to the user on the GUI of the site will be developed.

Reporting to track the individual sell transactions for each user, and reporting to incorporate the sell transactions into overall revenue reports will be developed.

Business Model:

The primary model is to offer a unique product that is highly marketable to attract more users to the website. The model may or may not increase the overall house edge of the site contests. The model will slightly decrease the entry cycle time of the user. (The user may use his cashout immediately to enter another contest if he wishes.)

Objectives:

The primary business objective is to develop a proprietary product that will attract players to a DFS site.

Example 3: "Limited Pick Fantasy Contest"

Overview:

The user picks a specific number of players (i.e. 10, 11, 12, 13, 14 or 15) for his fantasy entry. The user, instead of picking from a large pool of players, will be picking from a single pair of players for each of his player slots. For each slot, the user may pick Player A, Player B, or TIE. A tie is defined as occurring if the pair of fantasy players have an equal fantasy points score, or a score within 2 points of each other. A user gets a "point" for each correct answer. The prize pool will be fixed, but there a few ways the prize pool could be structured. Typically a DFS pool pays back to the users somewhere between 90 and 93 percent of the total entry fees. Prize payouts may optionally be increased each week by paying back 85% of the total entry fees, and saving 5% to add to the following week's prize structure, or a similar format that would maintain a fixed prize pool each week, but would grow the prize pool each week as well. This would eventually enable a very large prize pool to be offered. This may be an option for a land-based "kiosk" product as well which would print a receipt of the picks to each user after accepting the entry fee through a bill acceptor. An example is below:
- 100 entrants enter for $10 each
- Total prize pool is $850 (85% to be paid out, fixed. 5% to be added to next week's pool)

1st highest score and ties wins or split $500. 2nd highest score and ties wins or splits $350

Say 0 entries score 13. Say 5 entries score 12. Say 18 entries score 11.

The 5 entries with 12 points split $500 evenly for a payout of $100.00 each.

The 18 entries with 11 points split $350 evenly for a payout of $19.44 each.

The next week (or day's) contest would feature a prize pool of $900 (because $50, or 5% of last week's entry fees were added). The number of entrants and the entry fee would remain the same.

A sample non-graphic pick interface might look like:

| Column A | Column B | | |
|---|---|---|---|
| Brady, NE | Manning, Den | A T B | |
| Johnson, Det | Brown, Pit | A T B | |
| Lynch, Sea | Bernard, Cin | A T B | |
| ... | | | |
| ... | | | | etc. specific number of pairs of players

Functionality:

The user will have a different kind of interface to choose his players, a vertical listing of pairs of names and option to pick either player A, player B or TIE. The overall result is still based on skill and still based on the performances of different athletes from different sports events. The pairs of players may come from different events (or same), or even different sports. The user can very quickly pick his team and the system records each contest entry as usual, compares final scores, and distributes winning appropriately and reports on them in a similar fashion to other DFS contests.

Business Model:

The business model is a simple contest offering that is different from the regular DFS offering and features a steadily increasing prize pool. Both features are marketable and should attract players. The daily workings of the contest are similar to other DFS contests but with an easier GUI, low learning curve, and desirable, volatile prize structure.

Objectives:

The primary business objective is to offer a proprietary product that will attract new DFS players as well as draw extra play from existing DFS players. The suitable translation into a land based product is desirable as it may lead into quick and easy entry into that market.

Process:

The process to offer such a contest would be a fairly simple GUI development, along with required system logic. All other DFS tools and reporting should function similarly with this product, thereby reducing the time of product development.

A specific example of the Limited Pick Contest is detailed below:

| Process/flowchart description Pick 13 Process name | Processes follow a roughly chronological order Process description |
|---|---|
| User registers with site | User provides identifying information into a secure webform such as full name, address, phone number, email, date of birth, state or province of residence and agrees to site terms and conditions via checkbox. [Submit] button completes the user's registration into the site database provided the user meets age and location requirements. |
| User adds funds to account (optional) | User may add funds to his user account via PayPal, Credit Card, or other monetary device accepted by the site. The user may or may not receive bonus funds in conjunction with the transaction. |
| User clicks option to view contest lobby | The user may navigate to a section called "Contest Lobby" on the site, where the user may view a variety of contests which may include one or more "Pick 13" fantasy contests. |
| User views a particular Pick 13 contest | The user may click on a Pick-13 contest name or other button to view details of the contest. |
| User views details of the contest | The user is generally provided with some or all of the following details of the Pick 13 contest via a display on the site: entry fee amount (or free entry) maximum number of entries (total) permitted maximum numper of entries (per user) permitted contest type (guaranteed, or non-guaranteed) events included in contest (ie sport contests, political races, reality shows as described in the full application) scoring rules (such as 6 points per touchdown, or 1 point per inning pitched for example) number of selections required to be made by the user timeframe of contest (start time, (optional) finish time) prize table entries list (a list of other users that have entered same contest) |
| User creates contest entry | The user is presented with an interface to choose his selections for the contest. The interface may vary, but shall provide the basic functionality of displaying a certain number of "pairs" of selections. The user must choose an outcome for a specified number of "pairs" (13 in this contest example, but may be any other number). The user, for each selection must select either Selection A, Selection B, or "tie". |
| User enters contest and finalizes entry | The user, when satisfied with his entry details, may officially enter the contest via a [submit] or similarly titled button. If the system determines the entry is valid and the user has the required funds (if applicable) to enter the contest, the system will remove the funds (if applicable) from the user account and officially log the entry into the system database. |
| Entry changes | In some contests, in some cases, the user may be provided a method for exchanging some or all of his selections before the contest start time. This is generally accomplished by providing a button the user may click on to re-enter the player selection interface and make changes. Changes must be completed and submitted and accepted before contest start time. |
| Entry cancellation | In some contests, in some cases, the user may be provided a method to cancel his entry. In the case of a canceled entry the user receives a full refund of any entry fee. |
| Contest fills | The contest is filled when the maximum number of entrants is reached prior to contest start. When a contest fills completely, no more entries are accepted. |
| Contest begins, or is cancelled | The contest begins at the scheduled start time, or at the start of the first associated event. In the case of a non-guaranteed contest that does not achieve the required number of entrants before start-time, the contest will |

| Process/flowchart description Pick 13 Process name | Processes follow a roughly chronological order Process description |
|---|---|
| | cancel and users' will be refunded any entry fees. |
| Contest is in progress | During the contest, the site may provide a display of the user's selections, and other users' selections. The display may include information such as each selection's playing status, fantasy points accrued, scheduled start time, injury status and more. |
| Contest ends | After all events in the contest have reached conclusion, or at a pre-specified end-time, the contest concludes. |
| Fantasy points finalization | At sometime after the contest conclusion, fantasy points are finalized. |
| Final contestant score is determined | At some point after fantasy points finalization, final contestant score is determined. A contestant's score is the sum of the number of correct predictions of the contestant. |
| Tiebreaker status is determined | The contest may or may not feature a tiebreaker feature. A tiebreaker feature might comprise asking the user to predict the number of fantasy points of a certain possible selection on the user contest entry creation interface. In such an instance, the user with the closest prediction to the actual result would "win" the tiebreaker and be ranked ahead of other contestants with the same final score. |
| Awards are assigned to users' accounts | In most cases, the system will simply compare contestant scores and/or contestant rankings with the prize table to determine and "assign" prizes to the correct user accounts. |

Example 4: "Cross Sport DFS"

Overview:

Cross sport DFS would allow for the DFS site to offer a contest that allowed for picks of players from different sport types. A player would not be choosing from 6 NHL games for instance, but would have the ability to build a roster (for example) from 6 NHL games, 2 MLB games and 1 NFL game. This model would allow DFS providers to "lump in" "one-off" games from certain sports into other contests. This would enable users to pick players from such "one-off" events and gain a result that day or evening. Possible events include Awards Shows, Political Races, Poker Tournaments, and the like. Non-limiting examples of common "one-off" events include Monday night Football; Thursday Night football; Heavyweight boxing match; UFC title fight; Monday night Baseball; Friday college football; Olympic hockey championship; Olympic 100 m race; Academy Awards; Presidential/Gubernatorial races; World Series of Poker Main Event.

Functionality:

A player would choose "cross sport" from the main DFS site menu, and would assemble his team according to the roster limits. The Roster limits may be fixed, such as "1QB, 1RB, 1WR, 1TE (football) 1C, 1FW, 1D, 1G (hockey) 1 boxer (boxing)" or may be flexible such as "2 QB/C, 2RB/FW, 2 WR/D, 2TE/G, 1 boxer".

In all other respects, this would run as a very typical DFS contest, with fixed entry fees and prize pool, standard player values and scoring systems.

Business Model:

The business model is that of any other DFS contest. Users pay an entry fee, enter the contest, pick players, and are awarded prize funds appropriately.

Objectives:

Primary business objectives are:

Provide a proprietary product that allows for the inclusion of "one-off" sporting events on a daily basis, to increase attractiveness to users.

Provide a proprietary product that allows for cross sport contest offerings, to increase attractiveness to users.

Process:

Development time on the product would be relatively short as the product operates as a standard DFS contest in every respect, except for the inclusion of multiple sports. Scoring for each sport, and player values for each sport would likely remain the same as in other DFS contests.

A specific example is detailed below:

| Process/flowchart description Cross-sport Parlay Process name | Processes follow a roughly chronological order Process description |
|---|---|
| User registers with site | User provides identifying information into a secure webform such as full name, address, phone number, email, date of birth, state or province of residence and agrees to site terms and conditions via checkbox. [Submit] button completes the user's registration into the site database provided the user meets age and location requirements. |
| User adds funds to account (optional) | User may add funds to his user account via PayPal, Credit Card, or other monetary device accepted by the site. The user may or may not receive bonus funds in conjunction with the transaction. |
| User clicks option to view contest lobby | The user may navigate to a section called "Contest Lobby" on the site, where the user may view a variety of contests which may include one or more "Cross-Sport" fantasy contests. |
| User views a particular Cross Sport contest | The user may click on a Cross-Sport contest name or other button to view details of the contest. |
| User views details of the contest | The user is generally provided with some or all of the following details of the contest via a display on the site: entry fee amount (or free entry) maximum number of entries (total) permitted maximum numper of entries (per user) permitted contest type (guaranteed, or non-guaranteed) events included in contest (ie sport contests, political races, reality shows as described in the full application) scoring rules (such as 6 points per touchdown, or 1 point per inning pitched for example) timeframe of contest (start time, (optional) finish time) prize table entries list (a list of other users that have entered same contest) roster limits (a description of how many of each "type" of selections are required to complete the user entry. For example "1 football Quarterback, 2 hockey centers, 2 basketball guards, 1 baseball pitcher) salary cap (may or may not be present) (the sum of all user selections' salary values may not exceed the salary cap) |
| User creates contest entry | The user is presented with an interface to choose his selections for the contest. The interface may vary, but shall provide the basic functionality of viewing a list of possible selections which are available to be chosen by the user for the contest, and the corresponding "salary" of that selection. |
| User enters contest and finalizes entry | The user, when satisfied with his entry details, may officially enter the contest via a [submit] or similarly titled button. If the system determines the entry is valid and the user has the required funds (if applicable) to enter the |

| Process/flowchart description | |
|---|---|
| Cross-sport Parlay Process name | Processes follow a roughly chronological order Process description |
| | contest, the system will remove the funds (if applicable) from the user account and officially log the entry into the system database. |
| Entry changes | In some contests, in some cases, the user may be provided a method for exchanging some or all of his selections before the contest start time. This is generally accomplished by providing a button the user may click on to re-enter the player selection interface and make changes. Changes must be completed and submitted and accepted before contest start time. |
| Entry cancellation | In some contests, in some cases, the user may be provided a method to cancel his entry. In the case of a canceled entry the user receives a full refund of any entry fee. |
| Contest fills | The contest is filled when the maximum number of entrants is reached prior to contest start. When a contest fills completely, no more entries are accepted. |
| Contest begins, or is cancelled | The contest begins at the scheduled start time, or at the start of the first associated event. In the case of a non-guaranteed contest that does not achieve the required number of entrants before start-time, the contest will cancel and users' will be refunded any entry fees. |
| Contest is in progress | During the contest, the site may provide a display of the user's selections, and other users' selections. The display may include information such as each selection's playing status, fantasy points accrued, scheduled start time, injury status and more. |
| Contest ends | After all events in the contest have reached conclusion, or at a pre-specified end-time, the contest concludes. |
| Fantasy points finalization | At sometime after the contest conclusion, fantasy points are finalized. |
| Final contestant ranking is determined | At some point after fantasy points finalization, final contestant ranking is determined. |
| Awards are assigned to users' accounts | In most cases, the system will simply compare contestant rankings with the prize table to determine and "assign" prizes to the correct user accounts. |

Example 5: Parlay Payouts

Overview:

The parlay payouts project would offer a way for a player to increase the payout amount, and volatility, of his contest entries as a whole. It is important to note that all prize structures, all fixed prize pools would remain the same. The user is allowed, in advance, to choose whether he would like to combine all of his results for a larger potential end payout. With the parlay product the only other stipulation is that the user would need to earn a prize in all of the contests he entered into inclusion into the parlay offer.

Example

A user decides to enter 5 "50/50" contests whereby he enters $11 to be paid $20 if he comes in the top 5 out of 10 contestants. These are standard DFS contests.
The user decides to place these 5 entries into a parlay payout option. The user must win a prize in all 5 of the contests to win a total payout prize. If the user does not win a prize in all contests, he does not win an overall parlay prize (and is paid nothing).

In this fashion, the user may win a total prize amount of $1267 (for $1212 profit) for placing in the money in all 5 contests, rather than the regular $105 prize amount (for $50 profit). Of course the downside for the player is that he will be awarded $0 if he doesn't not place "in the money" in any 1 or more of the contests.

Functionality:

The player would be offered a chance to parlay multiple contest entries on the user interface. This would generally occur before the user entered contests, but could just as easily be offered after the contest entries have been made. The system would wait until the results of all contests included in the parlay entry, and would award appropriate prize money according to parlay rules. All contest prize pools, entry limits, scoring rules, roster limits would remain the same. The player would still be utilizing skill in order to win a prize.

Business Model:

The primary business model would be to offer the parlay option as a regular "add-on" feature to standard fantasy contests. The parlay option would be attractive to many players and increase traffic on the site. The parlay option may increase, or may not increase, the overall house edge of the DFS product, depending on how payouts were structured.

Objectives:

The primary business objective would be to attract more users to the DFS site.

A secondary objective, if desired, would be to structure the parlay payout in order to increase overall house edge on the site. This is optional and design-dependent.

Process:

The parlay system structure may be built into the system as well as into front-end interfaces. The time in development could vary depending on how the site decides to offer the product, and how reports in the admin panel would need to be modified. The process of the product itself is a very simple, modifiable math equation to determine payout on the product.

Example 6: DFS Point Threshold Payouts

Overview:

DFS Point Threshold payouts is a product whereby the user picks a standard DFS salary cap team, but instead of (or in addition to) playing against other users, he/she plays against a pre-prescribed points "scale" to determine payout. The product meets all UIGEA exception criteria, and also solves 2 fundamental obstacles of DFS operations:
the need to amass many users/entries to have a contest start
the desire to offer large payouts to attract users Example A user chooses the point threshold product, sport, and bet amount. (OR, may enter a regular contest and then choose to make a side bet on the same selections in the point threshold product)
The user picks his DFS salary cap team of athletes using their standard athlete values and salary cap.
The user will see a display of how many fantasy points his team needs to achieve to win a particular prize.
The user submits the entry. The scoring rules are the same as standard DFS contests.
After all sports events are complete and the user has a final fantasy points score, the system compares the score vs the payout chart and applies the appropriate amount of winnings (if any) to the user account.

Functionality:

The user would be offered the opportunity to play as part of a regular DFS salary cap contest, or as a separate product altogether. The user would in either case use the standard DFS salary cap selection interface to choose his team, with an additional display in view that would describe the payout structure. Reporting would be somewhat similar to standard DFS reporting: All transactions and athlete selections would be logged, scored, and assigned prize amounts and would be viewable in the appropriate reports.

Business Model:

Primary business models would be to utilize the product on our home site, or to license out the product individually or as part of a larger software package.

Objectives:

The primary business objective would be to attract more users to the DFS site.

Secondary business objective is to offer a higher house-edge product with increased volatility and higher player payouts, all of which may be desirable to the gaming operation or licensees gaming operations.

Process:

We would need to use existing and gathered data to build a mathematical model for threshold payouts. The model would depend on:
Team roster limits
Salary values
Salary cap
scoring rules
historical user selection data
house edge desired
volatility desired After the mathematical models are determined, fairly straightforward SW development would be needed to implement the product to the DFS site.

Example 7: Propositions

A "proposition" as defined herein is question posed to a user of within a contest of which the answer to can and will be objectively graded as either correct or incorrect. Propositions may be used as the primary scoring components or as a secondary scoring or tiebreak component of a contest. For example, in a Limited Pick Fantasy Contest (set forth in example 3), if 2 users are tied for highest score, the 1$^{st}$ prize user could be determined based on the outcome of a series of pre-determined questions or propositions.

Scoring: In an exemplary embodiment, a user will be given 1 point for each correct proposition answer. In other embodiments a user is given 2 or 3 or 500 or any other number of points for correct proposition answers, depending on the scoring system used.

Prizes: In certain embodiments, the use of propositions in a contest(s) is completely independent of the prizes awarded in the contests. In specific embodiments UIGEA and other regulations are adhered to when crafting a prize table.

Contest types: Propositions maybe used in many different DFS contest formats. In certain embodiments, the contests will adhere to the following stipulations:
The score achieved by a user would be based on the athletic performances of multiple athletes from more than a single event.
The prize table is predetermined and not based on the number of user entries in the contest Non-limiting examples of propositions for the daily fantasy market include but are not limited to:

A) A question requiring yes/no answer regarding a specific athlete's athletic performance in a specific event. An exemplary question is as follows:
Q. Will Antonio Brown surpass 86.5 yards receiving in the Steelers v Browns game
A. Yes/No
This can be objectively graded after the contest.

B) A question requiring an answer of player A or player B regarding comparative athletic performances. Exemplary questions include:
Q. Who will throw for more passing yards on October 20, Ben Roethlisberger or Colt McCoy?
A. Roethlisberger/McCoy C) A multiple choice question requiring a user to pick several athletes to complete a benchmark of athletic performance. An exemplary question is as follows:
Q. Of the following list, pick 3 players who will catch a touchdown pass on October 20: Antonio Brown; Calvin Johnson; Percy Harvin; Michael Evans; Sammy Watkins; Demaryius Thomas; Markus Wheaton; Darren Sproles; Jimmy Graham; Rob Gronkowski
A. User picks 3 athletes. A user with 0, 1 or 2 correct will be graded as incorrect.

D) A question comparing the athletic performances of sets of athletes. An exemplary question is as follows:
Q. Which set of players will rush for more combined yards on October 20? Marshawn Lynch and Christine Michael; Jonas Hill and LeGarrette Blount; Arian Foster and Alfred Blue
A. User picks one set of players]

E) Custom question of a different format that relates primarily to athletic performance of athletes. An exemplary question is as follows:
Q. Which will be the highest total on October 20? a. Points scored by Kobe Bryant; b. Laps led by Dale Earnhardt Jr; c. Yards rushing for Giovanni Bernard?
A. User picks a, b or c.

F) A question that asks the user to choose between 2 or more athletes relating to the comparative "fantasy points" performance of the athletes. An exemplary question is as follows:
Q. Which athlete will have the higher fantasy points total for October 20? a. Tom Brady; b. Peyton Manning A specific non-limiting example of a proposition contest is detailed below as "Magic Million."

Magic Million Overview:

The Magic Million is designed to comply with UIGEA fantasy exception rules. The contest is run as a 100 person or 100 entry contest which may be respawned once the contest is filled. Entry fee is $11. $850 is given out as prize money to the top 10 finishers. $1 million is given to any user with 20/20 score. The props are designed as basic coin flip propositions using Rotowire projections. Example question: "Will Antonio Brown exceed 84.5 yards receiving this week?" [Y/N answer]. If any of the 20 players do not play in their games . . . the contest will be voided and fees refunded. For this reason no players with Questionable or doubtful injury status will be included. Likewise, players with uncertain bench/start status will also likely be disincluded. If there is a tie for placing, monies will be divided . . . there will be no extra prize money distributed. Only one $1 million prize may be awarded in a given week. If multiple 20/20 entries are received from same or different contests, the $1M would be split amongst those winners. All 20 propositions must not contain only athletes from one event, athletes from multiple sporting events must be represented in the prop questions.

Users are awarded 1 point for each correct answer. Users are awarded 0.5 points for each answer which results in a tie. Users are not awarded any points for an incorrect answer. A user's final score is the sum of all points. Users will be ranked according to their final scores, highest to lowest, and the prize table applied to award prizes.

| Placing | Entry Fee | Payout | Bonus Payout 1M Probability | Bonus Payout Amount | Bonus Payout Return |
|---|---|---|---|---|---|
| 1 | 11 | 350.0000000000 | 0.0000009540 | $1,000,000.0000000000 | 0.9540000000 |
| 2 | 11 | 200.0000000000 | 0.0000009540 | $1,000,000.0000000000 | 0.9540000000 |
| 3 | 11 | 150.0000000000 | 0.0000009540 | $1,000,000.0000000000 | 0.9540000000 |
| 4 | 11 | 50.0000000000 | 0.0000009540 | $1,000,000.0000000000 | 0.9540000000 |
| 5 | 11 | 45.0000000000 | 0.0000009540 | $1,000,000.0000000000 | 0.9540000000 |
| 6 | 11 | 11.0000000000 | 0.0000009540 | $1,000,000.0000000000 | 0.9540000000 |
| 7 | 11 | 11.0000000000 | 0.0000009540 | $1,000,000.0000000000 | 0.9540000000 |
| 8 | 11 | 11.0000000000 | 0.0000009540 | $1,000,000.0000000000 | 0.9540000000 |
| 9 | 11 | 11.0000000000 | 0.0000009540 | $1,000,000.0000000000 | 0.9540000000 |
| 10 | 11 | 11.0000000000 | 0.0000009540 | $1,000,000.0000000000 | 0.9540000000 |
| 11 | 11 | 0.0000000000 | 0.0000009540 | $1,000,000.0000000000 | 0.9540000000 |
| 12 | 11 | 0.0000000000 | 0.0000009540 | $1,000,000.0000000000 | 0.9540000000 |
| 13 | 11 | 0.0000000000 | 0.0000009540 | $1,000,000.0000000000 | 0.9540000000 |
| 14 | 11 | 0.0000000000 | 0.0000009540 | $1,000,000.0000000000 | 0.9540000000 |
| 15 | 11 | 0.0000000000 | 0.0000009540 | $1,000,000.0000000000 | 0.9540000000 |
| 16 | 11 | 0.0000000000 | 0.0000009540 | $1,000,000.0000000000 | 0.9540000000 |
| 17 | 11 | 0.0000000000 | 0.0000009540 | $1,000,000.0000000000 | 0.9540000000 |
| 18 | 11 | 0.0000000000 | 0.0000009540 | $1,000,000.0000000000 | 0.9540000000 |
| 19 | 11 | 0.0000000000 | 0.0000009540 | $1,000,000.0000000000 | 0.9540000000 |
| 20 | 11 | 0.0000000000 | 0.0000009540 | $1,000,000.0000000000 | 0.9540000000 |
| 21 | 11 | 0.0000000000 | 0.0000009540 | $1,000,000.0000000000 | 0.9540000000 |
| 22 | 11 | 0.0000000000 | 0.0000009540 | $1,000,000.0000000000 | 0.9540000000 |
| 23 | 11 | 0.0000000000 | 0.0000009540 | $1,000,000.0000000000 | 0.9540000000 |
| 24 | 11 | 0.0000000000 | 0.0000009540 | $1,000,000.0000000000 | 0.9540000000 |
| 25 | 11 | 0.0000000000 | 0.0000009540 | $1,000,000.0000000000 | 0.9540000000 |
| 26 | 11 | 0.0000000000 | 0.0000009540 | $1,000,000.0000000000 | 0.9540000000 |
| 27 | 11 | 0.0000000000 | 0.0000009540 | $1,000,000.0000000000 | 0.9540000000 |
| 28 | 11 | 0.0000000000 | 0.0000009540 | $1,000,000.0000000000 | 0.9540000000 |
| 29 | 11 | 0.0000000000 | 0.0000009540 | $1,000,000.0000000000 | 0.9540000000 |
| 30 | 11 | 0.0000000000 | 0.0000009540 | $1,000,000.0000000000 | 0.9540000000 |
| 31 | 11 | 0.0000000000 | 0.0000009540 | $1,000,000.0000000000 | 0.9540000000 |
| 32 | 11 | 0.0000000000 | 0.0000009540 | $1,000,000.0000000000 | 0.9540000000 |
| 33 | 11 | 0.0000000000 | 0.0000009540 | $1,000,000.0000000000 | 0.9540000000 |
| 34 | 11 | 0.0000000000 | 0.0000009540 | $1,000,000.0000000000 | 0.9540000000 |
| 35 | 11 | 0.0000000000 | 0.0000009540 | $1,000,000.0000000000 | 0.9540000000 |
| 36 | 11 | 0.0000000000 | 0.0000009540 | $1,000,000.0000000000 | 0.9540000000 |
| 37 | 11 | 0.0000000000 | 0.0000009540 | $1,000,000.0000000000 | 0.9540000000 |
| 38 | 11 | 0.0000000000 | 0.0000009540 | $1,000,000.0000000000 | 0.9540000000 |
| 39 | 11 | 0.0000000000 | 0.0000009540 | $1,000,000.0000000000 | 0.9540000000 |
| 40 | 11 | 0.0000000000 | 0.0000009540 | $1,000,000.0000000000 | 0.9540000000 |
| 41 | 11 | 0.0000000000 | 0.0000009540 | $1,000,000.0000000000 | 0.9540000000 |
| 42 | 11 | 0.0000000000 | 0.0000009540 | $1,000,000.0000000000 | 0.9540000000 |
| 43 | 11 | 0.0000000000 | 0.0000009540 | $1,000,000.0000000000 | 0.9540000000 |
| 44 | 11 | 0.0000000000 | 0.0000009540 | $1,000,000.0000000000 | 0.9540000000 |
| 45 | 11 | 0.0000000000 | 0.0000009540 | $1,000,000.0000000000 | 0.9540000000 |
| 46 | 11 | 0.0000000000 | 0.0000009540 | $1,000,000.0000000000 | 0.9540000000 |
| 47 | 11 | 0.0000000000 | 0.0000009540 | $1,000,000.0000000000 | 0.9540000000 |
| 48 | 11 | 0.0000000000 | 0.0000009540 | $1,000,000.0000000000 | 0.9540000000 |
| 49 | 11 | 0.0000000000 | 0.0000009540 | $1,000,000.0000000000 | 0.9540000000 |
| 50 | 11 | 0.0000000000 | 0.0000009540 | $1,000,000.0000000000 | 0.9540000000 |
| 51 | 11 | 0.0000000000 | 0.0000009540 | $1,000,000.0000000000 | 0.9540000000 |
| 52 | 11 | 0.0000000000 | 0.0000009540 | $1,000,000.0000000000 | 0.9540000000 |
| 53 | 11 | 0.0000000000 | 0.0000009540 | $1,000,000.0000000000 | 0.9540000000 |
| 54 | 11 | 0.0000000000 | 0.0000009540 | $1,000,000.0000000000 | 0.9540000000 |
| 55 | 11 | 0.0000000000 | 0.0000009540 | $1,000,000.0000000000 | 0.9540000000 |
| 56 | 11 | 0.0000000000 | 0.0000009540 | $1,000,000.0000000000 | 0.9540000000 |
| 57 | 11 | 0.0000000000 | 0.0000009540 | $1,000,000.0000000000 | 0.9540000000 |
| 58 | 11 | 0.0000000000 | 0.0000009540 | $1,000,000.0000000000 | 0.9540000000 |
| 59 | 11 | 0.0000000000 | 0.0000009540 | $1,000,000.0000000000 | 0.9540000000 |
| 60 | 11 | 0.0000000000 | 0.0000009540 | $1,000,000.0000000000 | 0.9540000000 |
| 61 | 11 | 0.0000000000 | 0.0000009540 | $1,000,000.0000000000 | 0.9540000000 |
| 62 | 11 | 0.0000000000 | 0.0000009540 | $1,000,000.0000000000 | 0.9540000000 |
| 63 | 11 | 0.0000000000 | 0.0000009540 | $1,000,000.0000000000 | 0.9540000000 |
| 64 | 11 | 0.0000000000 | 0.0000009540 | $1,000,000.0000000000 | 0.9540000000 |
| 65 | 11 | 0.0000000000 | 0.0000009540 | $1,000,000.0000000000 | 0.9540000000 |
| 66 | 11 | 0.0000000000 | 0.0000009540 | $1,000,000.0000000000 | 0.9540000000 |
| 67 | 11 | 0.0000000000 | 0.0000009540 | $1,000,000.0000000000 | 0.9540000000 |
| 68 | 11 | 0.0000000000 | 0.0000009540 | $1,000,000.0000000000 | 0.9540000000 |
| 69 | 11 | 0.0000000000 | 0.0000009540 | $1,000,000.0000000000 | 0.9540000000 |
| 70 | 11 | 0.0000000000 | 0.0000009540 | $1,000,000.0000000000 | 0.9540000000 |
| 71 | 11 | 0.0000000000 | 0.0000009540 | $1,000,000.0000000000 | 0.9540000000 |
| 72 | 11 | 0.0000000000 | 0.0000009540 | $1,000,000.0000000000 | 0.9540000000 |

-continued

| Placing | Entry Fee | Payout | Bonus Payout 1M Probability | Bonus Payout Amount | Bonus Payout Return |
|---|---|---|---|---|---|
| 73 | 11 | 0.0000000000 | 0.0000009540 | $1,000,000.0000000000 | 0.9540000000 |
| 74 | 11 | 0.0000000000 | 0.0000009540 | $1,000,000.0000000000 | 0.9540000000 |
| 75 | 11 | 0.0000000000 | 0.0000009540 | $1,000,000.0000000000 | 0.9540000000 |
| 76 | 11 | 0.0000000000 | 0.0000009540 | $1,000,000.0000000000 | 0.9540000000 |
| 77 | 11 | 0.0000000000 | 0.0000009540 | $1,000,000.0000000000 | 0.9540000000 |
| 78 | 11 | 0.0000000000 | 0.0000009540 | $1,000,000.0000000000 | 0.9540000000 |
| 79 | 11 | 0.0000000000 | 0.0000009540 | $1,000,000.0000000000 | 0.9540000000 |
| 80 | 11 | 0.0000000000 | 0.0000009540 | $1,000,000.0000000000 | 0.9540000000 |
| 81 | 11 | 0.0000000000 | 0.0000009540 | $1,000,000.0000000000 | 0.9540000000 |
| 82 | 11 | 0.0000000000 | 0.0000009540 | $1,000,000.0000000000 | 0.9540000000 |
| 83 | 11 | 0.0000000000 | 0.0000009540 | $1,000,000.0000000000 | 0.9540000000 |
| 84 | 11 | 0.0000000000 | 0.0000009540 | $1,000,000.0000000000 | 0.9540000000 |
| 85 | 11 | 0.0000000000 | 0.0000009540 | $1,000,000.0000000000 | 0.9540000000 |
| 86 | 11 | 0.0000000000 | 0.0000009540 | $1,000,000.0000000000 | 0.9540000000 |
| 87 | 11 | 0.0000000000 | 0.0000009540 | $1,000,000.0000000000 | 0.9540000000 |
| 88 | 11 | 0.0000000000 | 0.0000009540 | $1,000,000.0000000000 | 0.9540000000 |
| 89 | 11 | 0.0000000000 | 0.0000009540 | $1,000,000.0000000000 | 0.9540000000 |
| 90 | 11 | 0.0000000000 | 0.0000009540 | $1,000,000.0000000000 | 0.9540000000 |
| 91 | 11 | 0.0000000000 | 0.0000009540 | $1,000,000.0000000000 | 0.9540000000 |
| 92 | 11 | 0.0000000000 | 0.0000009540 | $1,000,000.0000000000 | 0.9540000000 |
| 93 | 11 | 0.0000000000 | 0.0000009540 | $1,000,000.0000000000 | 0.9540000000 |
| 94 | 11 | 0.0000000000 | 0.0000009540 | $1,000,000.0000000000 | 0.9540000000 |
| 95 | 11 | 0.0000000000 | 0.0000009540 | $1,000,000.0000000000 | 0.9540000000 |
| 96 | 11 | 0.0000000000 | 0.0000009540 | $1,000,000.0000000000 | 0.9540000000 |
| 97 | 11 | 0.0000000000 | 0.0000009540 | $1,000,000.0000000000 | 0.9540000000 |
| 98 | 11 | 0.0000000000 | 0.0000009540 | $1,000,000.0000000000 | 0.9540000000 |
| 99 | 11 | 0.0000000000 | 0.0000009540 | $1,000,000.0000000000 | 0.9540000000 |
| 100 | 11 | 0.0000000000 | 0.0000009540 | $1,000,000.0000000000 | 0.9540000000 |
| | 1100 | 850 | | | 95.4000000000 |

|  |  |
|---|---|
| total handle | $1,100.00 |
| pool payouts | $850.00 |
| bonus payouts | $95.40 |
| total payouts | $945.40 |
| overall RTP % | 85.94545% |
| overall HE % | 14.05455% |
| RTP without 1M bonus | 77.27273% |
| HE without 1M bonus | 22.72727% |

Example 8: Exemplary Scoring for Fantasy Contests

Football Scoring:
Offense
Rushing yards made=0.1 pts
Rushing touchdowns=6 pts
Passing yards=0.04 pts
Passing touchdowns=4 pts
Interceptions=−1 pt (negative)
Receiving yards=0.1 pts
Receiving touchdowns=6 pts
Receptions=1 pt
Kick-return touchdowns=6 pts
Punt-return touchdowns=6 pts
Fumbles lost=−2 pts (negative)
Own fumbles recovered touchdowns=6 pts
Two-point conversions scored=2 pts
Two-point conversion passes=2 pts
Field-goals from 0-19 yards=3 pts
Field-goals from 20-29 yards=3 pts
Field-goals from 30-39 yards=3 pts
Field-goals from 40-49 yards=4 pts
Field-goals from 50+ yards=5 pts
Extra-point conversions=1 pt
Defense
Sacks=1 pt
Opponent-fumbles recovered=2 pts
Return touchdowns=6 pts
Interception return touchdowns=6 pts
Fumble return touchdowns=6 pts
Safeties=2 pts
Blocked kicks=2 pts
Interceptions=2 pts
0 points allowed=10 pts
1-6 points allowed=7 pts
7-13 points allowed=4 pts
14-20 points allowed=1 pt
28-34 points allowed=−1 pt
35+ points allowed=−4 pts
Note: For purposes of defensive scoring, points allowed are calculated based on offensive scoring as follows:
+6*(Rushing TD+Receiving TD+Fumble TD)
+2*(Two point conversions)
+1 Extra Points
+3 (Field Goals)
In an exemplary embodiment, the Football Rosters consists of 9 players and includes players from a minimum of three different teams. In this embodiment, the 9 roster positions are: QB, RB, RB, WR, WR, WR, WR, TE, D. A fixed salary cap of $50,000 to draft the roster is assigned.
Basketball Scoring:
3-pt FG=3 pts
3-pt FG Bonus=0.5 pts
2-pt FG=2 pts FT=1 pt
Rebound=1 pts
Assist=1 pts
Block=2 pts
Steal=2 pts
Turnover=−1 pt (negative)
In an exemplary embodiment, the Basketball Rosters consists of 9 players and includes players from a minimum of three different teams. In this embodiment, the 9 roster positions are: G, G, G, G, F, F, F, F, C. A fixed salary cap of $50,000 to draft the roster is assigned.
PGA Scoring:
Golfer Rank 1=40 pts
Golfer Rank 2=35 pts
Golfer Rank 3=30 pts
Golfer Rank 4=26 pts
Golfer Rank 5=22 pts
Golfer Rank 6=20 pts
Golfer Rank 7=19 pts
Golfer Rank 8=18 pts
Golfer Rank 9=17 pts
Golfer Rank 10=16 pts
Golfer Rank 11-15th=10 pts
Golfer Rank 16-20th=8 pts
Golfer Rank 21-25th=6 pts
Golfer Rank 26-30=4 pts
Golfer Rank 31-35=2 pts
Golfer Rank 36-40=1 pts
PAR=0 pts
Birdie=2 pts
Bogey=−2 pts
Eagle=3 pts
Double Bogey=−3 pts
Better than Eagle=5 pts
Worse than Double Bogey=−5 pts
MLB Scoring
Pitchers:
Winning Pitcher=8
Earned Runs=−2
Strikeouts=2
Innings Pitched=2
Walks=−0.50
Hit Batsman=−0.50
Complete Game=2
No Hitter=8
Complete Game Shut Out=4
Hitters:
Singles=2
Doubles=4
Triples=6
Home Runs=8
Runs Batted In =4
Runs=2
Walks=2
Stolen Bases=4
Strike Outs=−0.50
In an exemplary embodiment, the MLB Rosters consists of 9 players and includes players from a minimum of three different teams. In this embodiment, the 9 roster positions are: P, C, 1B, 2B, 3B, SS, OF, OF, OF. A fixed salary cap of $50,000 to draft the roster is assigned.
For Non-Sports
the fantasy points assigned would not be to an athlete's statistical performance, but to a personage's specifically detailed performance. Examples:

A politician may accrue fantasy points by the number of votes he receives, or number of delegates he "wins" in an election.

An actor might accrue fantasy points for winning a particular award(s) such as Academy awards "best actor" award.

A horse might accrue 2 fantasy points for each half-second he runs beneath a benchmark. (Say the benchmark is 1:30 and the horse runs a race in 1:26.5, the horse would have accrued (3.5*2) 7 fantasy points.

A reality show contestant might accrue fantasy points by the number of in-show competitions he wins.

Example 9: Point Spread Based Roster Limit and Scoring System

In this specific embodiment, the user is presented with a roster limit similar to other DFS contests, where the user must assemble a roster of a specific number of athletes, restricted by position. For instance, in the example below, the user must adhere to the roster limit of 1 QB, 2 RB, 4WR, 1TE and 1D.

The user is NOT restricted by salary cap constraints. The athletes presented for selection do NOT have a salary value attached to them. Each athlete has a point spread value attached to them. The point spread may be negative, positive, or zero. The point spreads are formulated by first generating a player salary for the athlete (for use in other DFS contests) and applying a mathematical formula which converts the salary to a pointspread. The formula may change or be adjusted at management discretion.

The user, as in a standard DFS contest, selects athletes and submits a lineup with contest entry fee which is logged in the software system. The user's selections accrue fantasy points as per the standard fantasy scoring system used in the standard salary cap variety of the game. At the end of the contest (or during the contest), the pointspread adjustment is applied to each athlete's fantasy point total. As seen in the example below each athlete has a real fantasy point score, and a point-spread adjusted total. The point-spread adjusted totals are summed for each user entry and used to give each user a final score. It is these point-spread adjusted final scores which are used for ranking of the user entries and awarding of prizes from the pre-set prize table.

| Player name | Position | point spread | Actual fantasy points scored | Adjusted (final) score |
|---|---|---|---|---|
| P. Manning | QB | −8.5 | 28.2 | 19.7 |
| M. Lynch | RB | −9.2 | 7 | −2.2 |
| C. Michael | RB | 8 | 5 | 13 |
| C. Johnson | WR | −9.8 | 30.6 | 20.8 |
| D. Bryant | WR | −6.9 | 25.3 | 18.4 |
| J. Kearse | WR | 5.1 | 10.3 | 15.4 |
| D. Heyward-Bey | WR | 8.2 | 19.1 | 27.3 |
| Ed Dickson | TE | 5.9 | 0 | 5.9 |
| Rams Defense | D | 4.9 | 3.7 | 8.6 |
| | | Totals | 129.2 | 126.9 |

Example 10: Point Threshold Contests

This Example Describes Point Threshold Contests.

Threshold contest may be either a salary cap or non salary cap contest (ex. point spread contests). Salary cap contests are those such that player selections are constrained by a total salary cap and players selections in the player pool are assigned a salary value based on historical performance. In a point spread contest, rather than being constrained by points, players are assigned a point spread which handicaps them based on historical performance (see example 9).

Payouts on point threshold contests may have a minimum guaranteed payout with point threshold payouts on top. An example of this payout structure is as follows 10 entries at $10 each with a guaranteed payout of $90 among those entries Could be payout structure of Winner take all $90, top 5 win $18, or any other payout structure If an entry hits the point threshold, that entry will win the Jackpot amount, or it will be split between multiple entries if multiple entries hit the point threshold.

Contests may be single sport or multi sport contests.

Such point threshold contests may be standalone contests or supplemental to a primary contest. In the specific examples below, the entry fee is $10.

Stand Alone Point Threshold Contest

| Payout | Probability | Expected Payout | Point Threshold |
|---|---|---|---|
| $1,000,000.00 | 0.000001 | $1.00 | 235 |
| $100,000.00 | 0.00001 | $1.00 | 215 |
| $1,000.00 | 0.001 | $1.00 | 180 |
| $100.00 | 0.01 | $1.00 | 160 |
| $25.00 | 0.02 | $0.50 | 150 |
| $10.00 | 0.1 | $1.00 | 135 |
| Total | 0.1 | $5.50 | |

The above payouts are based on a contest with $10 entry fee and no other payouts. The rake on this contest is 45%, but it is intentionally created high due to the volatility of payouts and exposure on the company side. On 100 entries we expect to take in $1000. 10 of those entries should score in some respect with 8 winning their entry fee back and a total of $550 to be paid out.

On Top of Normal Payouts

| Payout | Probability | Expected Payout | Point Threshold |
|---|---|---|---|
| $1,000,000.00 | 0.00000001 | $0.01 | 265 |
| $100,000.00 | 0.0000001 | $0.01 | 250 |
| $1,000.00 | 0.00001 | $0.01 | 215 |
| $100.00 | 0.0001 | $0.01 | 200 |
| $25.00 | 0.0002 | $0.005 | 195 |
| $10.00 | 0.001 | $0.01 | 180 |
| Total | 0.001 | $0.055 | |

The above payouts are based on a contest with $10 entry fee and normal payouts at 10% rake (or 12% rake if we wish to maintain rake with point threshold payouts). The expected additional payout per $10 entry is $0.55 with point threshold payouts. This reduced rake to 9.45% (or 11.45% if rake is increased).

Example 11: Fantasy Financial

This example relates to contests where a user (client) picks a roster of financial securities, including but not limited to stocks, bonds, commodities, currencies, indexes, mutual funds or combinations thereof, in a contest against other users where the roster is assigned a point value based on the movements of those stocks on his roster. The roster may include between 2 and any number security selections depending on the contest type offered. The roster picks may be from a selection of predetermined picks, may be limited be limited by industry (technology, oil, service, healthcare, financial, etc.), cap (small cap, mid cap, large cap), volume (high activity vs low activity), other characteristics (blue chip, penny), exchange traded on, may be limited by volume of trading, market cap, or exchange traded on or may have no limitations on selection on pick. The action taken on financial securities includes and is not limited to: buy, sell, call, put, future or other exercisable options.

Scoring on the roster may include but is not limited to scoring based on percentage change in price over the contest period; scoring based on ticks over the contest period; separate scoring systems for different roster positions (blue chip versus penny stock). Scoring may be based on simply how many stocks in roster increased/decreased in value without basis on the size of the increase/decrease.

A roster of financial securities may be used in a variety of DFS contests and payout structures. There may be limits on the selections a user can make (not all securities from same industry, same exchange traded on, all penny stocks, etc.). Securities choices may be assigned a salary value or point spread (for non-salary cap contests) based on historical performance of the stock and current market or industry conditions.

Example 11: Social Fantasy

This example relates to contests where a user (client) picks a roster of active social media users in a contest against other users where the roster is assigned a point value based on the activity of those active social media users over the time frame in which the contest covers. Examples of roster structures include, but are not limited to: a roster of 2 to unlimited social media users depending on the contest offered; where roster spots may be limited by social media site (facebook, twitter, instagram, pinterest, etc.), industry (actor, sports, politician, etc.), volume (high follower base vs low follower base), or given a utility/flex position where selections are not limited; pool of available picks may be limited by volume of users, popularity, social media activity, or other factors.

Scoring of these social media users includes but is not limited to: likes; comments; shares; new followers; retweets; pins; views; hearts or a combination thereof.

Different point values may be assigned to different events and how they relate to the social media user selected and the lineup may be graded on the cumulative performance of the roster. The social medial contests of can be of various sizes and payout structures. There may be limits on the selections a user can make (not all sections from the same social media site, same industry, etc.). Contests can have unique time periods as well, including but not limited to any contest from 5 minutes to hours or days.

Additionally, the contest may be run without a time period and simply a race to a predetermined value, such as first roster to get a cumulative number of views/likes/shares/comments/etc.

Example 12: Bad Beat Fantasy

In this specific embodiment, a user pays an extra percentage of his entry fee or a fixed amount for the possibility of a "Bad Beat". A "Bad Beat" may be defined, but is not limited to the following:

Choosing the best player at certain positions in your roster but still not winning the contest/placing in the money User hits a certain point threshold but still loses the contest (point threshold will be specific per league)

Payouts for a "Bad Beat" may be paid out as, but not limited to:

A jackpot per contest with percentage payouts to different placings in the contest (an example may be winner gets 20% of jackpot, first loser gets 70% of jackpot, and 10% remaining is split between the rest of entrants or bad beat buy-ins). The jackpot is created by the bad beat buy in fee.

A fixed jackpot paid out to all "Bad Beats" regardless of entry fee or contest size.

A cumulative jackpot that continues to aggregate until a user hits a "Bad Beat", again the jackpot is funded by user bad beat buy in fees.

In a specific exemplary contest, the "bad beat" may be as follows:

A user enters a Bad Beat designated contest where the entry fee is $10 and 100 entrants. In this specific example, where the contest rules stipulate 1% of entry fees will be put towards the accumulating Bad Beat jackpot pools. The contest features a House Edge of 10%, not including the 1% taken for Bad Beat pools (0.8% to primary, 0.2% to secondary). Accordingly, in this specific example where there is $1000 in entry fees, $10 will go towards the accumulating Bad Beat pools, and $890 will be distributed as the regular contest prize pool, and $100 will be kept by the site.

In this specific exemplary contest, the accumulated Bad Beat pools at the beginning of the day (jackpots are updated end-of-day) are $50,000 for the primary pool and $10,000 for the secondary pool. (The secondary pool becomes the primary pool once the primary Bad Beat Jackpot is won, and a new secondary pool starts from $0).

In this specific exemplary contest, the contest stipulates a user could win the bad beat by selecting the top fantasy-point scoring QB, RB, WR, and TE and the user has to spend 95% of his salary cap. The contest interface will ensure all valid entries have used minimum of 95% of the salary cap or the contest will not accept the entry. In order to win the "Bad beat", the user must be beaten by a user that did not have the exact same 4 top scoring QB, RB, WR, TE in his lineup. In the case of a bad beat the $2^{nd}$ place user wins 70% of the bad beat pool, the $1^{st}$ place user wins 20% of the bad beat pool, and the rest of the entries in the bad beat pool split the remaining 10%.

For example if User A ends up with the top scoring QB, RB, WR, TE and a fantasy score of 235 points; and User B ends up with the top scoring QB, RB, WR but not the top scoring TE, and scores a fantasy score of 237 points (because of a strong defensive performance, or strong RB2 and WR3 performances). AFTER the regular contest prize pool has been distributed, User A would receive $35,000 (0.7*$50,000), User B would receive $10,000 (0.2*$50,000), and the 98 remaining entries would receive $51.02 ((0.1*$150,000)/98). The secondary jackpot pool would now become the primary, with a new bad beat jackpot of $10,000 remaining after the bad beat win; and a new secondary pool would begin at $0.

The use of consolation contests gives the user a greater level of confidence in their lineup and avoids the bad user experience where they have a successful lineup but still do not place due to the comparative performance of their opponents in the contest. Also may bring in additional revenue from the rake brought in on "Bad Beat" pool entries.

Example 13: Lotto Fantasy

In certain embodiments of the contests, contest includes selection of picks from a group of options, points are awarded for each correct pick and prizes awarded based on number of points. In this embodiment, a simpler fantasy contest with a high potential for winnings at a relatively low entry fee is offered. It is believed that such contests will appeal to a larger market. In this embodiment, the contest structure involves a user/client entering a contest via any method (web, mobile, land-based, etc.) resembling a lotto structure. This may be run as, but is not limited to, the following structure:

User has 10 roster picks (number of roster picks may vary) to make, each one with a pool of 5 different players (players may or may not overlap between pools and number of players in pool may vary).

At each roster pick, the user is awarded a point/correct pick if the player he selects scores the most fantasy points out of the available players in the pool.

Prizes will be paid out based on how many correct picks that user has out of the 10.

This may be paid out as, but is not limited to, the following:

A pooled jackpot structure where a percentage of the jackpot is assigned to each of the assigned levels (for example 9 out of 10 picks correct may award you 80% of the prize pool) and the prize pool may or may not rollover to subsequent contests if not attained by any entrant.

Fixed payouts for each of the assigned levels dependent on entry fee and size of contest. If nobody wins the jackpot amount it is rolled into a bigger pool for the next contest.

A specific example is detailed below:

The contest proposal is a contest where a user has 10 opportunities to pick the highest scoring player from a pool of 5 players. The grand prize would be awarded if the user picked the highest scoring player at every spot. With random guessing, the probability of getting a single pick right is 0.20. To factor in some level of skill in picks we will increase that probability of 0.25. On a $2 entry this creates a rake of 23%.

| Correct Picks | Probability | Payout | Expected Payout |
| --- | --- | --- | --- |
| 0 | 0.056314 | $0.00 | $0.00 |
| 1 | 0.187712 | $0.00 | $0.00 |
| 2 | 0.281568 | $0.00 | $0.00 |
| 3 | 0.250282 | $0.00 | $0.00 |
| 4 | 0.145998 | $0.00 | $0.00 |
| 5 | 0.058399 | $2.00 | $0.12 |
| 6 | 0.016222 | $5.00 | $0.08 |
| 7 | 0.003090 | $20.00 | $0.06 |
| 8 | 0.000386 | $100.00 | $0.04 |
| 9 | 0.000029 | $10000.00 | $0.29 |
| 10 | 0.000001 | $1000000.00 | $0.95 |
| Total | 1.000000 | | $1.54 |

Example 14: Network

In certain embodiments, there is also provided a network of sites running a common contest within the network. In this embodiment, the common contest includes participants from all participating network sites and those users play against each other with all entered users being eligible for prize payouts. Contest rake will be redistributed to network sites participating in the contest based on number of entrants per site, entry fee, and the rake percentage.

By having a network, it allows for high volume contests with very large payouts without the need for high volume on their own sites. Pooling users from all network sites allows for very large payouts without each site taking on too much risk.

Example 15: Devices for Conducting Fantasy Contests

This example describes embodiments of the device for conducting fantasy contests. In particular, the device allows for users at various land based locations, including but not limited to land based such as lounges, bars, restaurants, clubs and similar type locations, to play the contests of the invention. The device allows for anonymous play and/or account-based play.

Tablets

In this embodiment, the device has is a tablet with a touchscreen interface. The introductory screen of the device has banners advertising certain contests, including DFS contest, and buttons to allow the player to either begin play or login. In the anonymous iteration, users may press the button for begin play on the device, choose such options as League Type and Entry Fee amount, and then are presented with a list of contests that match the selected criteria. The user selects a contest to enter and is directed to a page where the user could select their DFS lineup/roster using the touchscreen interface. The user submits the lineup and the system asks the user about playing another contest or completing the session. When the user is finished entering contests and has created the lineups for the selected contests, the system asks how the user would like to view the selected rosters and check results. In one embodiment, the device offers SMS/text and email address inputs for the user to specify. The system delivers the entry details via the method chosen. The system allows the user to add funds to his anonymous balance (or pre-created account) at several points during the process. The user might add funds before entering contest(s) or afterwards. Entries are only be considered valid and officially entered into the system database once the appropriate funds are added to the temporary balance or pre-created account and those funds then deducted from the balance to pay for the entry fees. Funds may be added using a variety of methods including but not limited to giving cash to a cashier staff member of the establishment, via credit card and via online e-wallet such as Paypal Once the session is completed a ticket/receipt is printed or emailed/SMS/texted to the user. This ticket may be used by the user to check their contest entry results, and/or to fund their balance for subsequent play with contest winnings or remaining balance left on the ticket. The results may be checked at the device that was used to play the contest, other devices of the invention and/or online. In certain embodiments, the user accomplishes this by holding the ticket in front of a code scanner/camera on the mobile tablet, or by typing in the number from the ticket on an interface on the tablet.

KIOSK Device:

The KIOSK devices may be essentially the as the tablet version previously detailed and may optionally include one or more of the following additions:

1) a BILL ACCEPTOR in the kiosk to receive CASH to fund the fantasy entry.
2) a PRINTER in the kiosk to print out fantasy entries/receipt. The printed fantasy entry receipt would include At LEAST:

date/timestamp of the entry
the entry fee of the entry
the dates and teams of the sports events that the entry is valid for
a unique ID # for the entry
a "name" of the contest entered (example: "Sunday $10 k NFL special")
a "league" that the contest is for (example: NHL)
an ID # of the kiosk the entry was placed at
the name of the location of the kiosk (example: "Joe's Lounge—Main Street")
the names and teams and positions of the fantasy players picked (example: Tom Brady—QB—NE, Antonio Brown—WR—Pit)
a barcode the kiosk ticket reader could read to identify the entry ID # on user return to the kiosk 3) The printer may also print out if appropriate a CASH VOUCHER. The cash voucher would simply be the cash amount left in the temporary anonymous account after the user makes an entry(ies) or after the user has returned with a winning entry. The cash voucher receipt would include at least:

date/timestamp the voucher was printed
a unique ID # for the voucher
an ID # of the kiosk the voucher was printed at
the name of the location of the kiosk (example: "Joe's Lounge—Main Street")
a barcode a cashier ticket reader could read to identify the voucher ID # on user visit to the cashier
the dollar amount of the worth of the voucher 4) A TICKET READER (which may be a barcode scanner) may be present in the kiosk. The ticket reader serves 2 primary functions described below:
A) A user could scan his ENTRY printout ticket in the reader. If the entry is a WINNER the kiosk would take the ticket, and add the amount of the win to the session balance so the user could place more entries or print out a cash voucher for the amount. If the entry is not a winner or the associated contest has not been finalized yet, the kiosk would display a notification to the user that the ticket is not a winner or has not been finalized yet, and would return the ticket to the user without adding any balance to the session.
B) A user could scan a CASH VOUCHER in the reader. In this case the amount of the cas voucher would be added to the session balance so the user could place further entry(ies).

5) A cashier system with ticket reader (which may be a barcode scanner). The cashier scanner would have the capability to read a CASH VOUCHER. The cashier (staff member) scans the ticket, pays the user the appropriate amount, and inputs into the system that the ticket is PAID and/or marks the ticket as PAID. The details such as the time and location the cash voucher was scanned and paid, and the amount of the transaction may be inputted into the system by the cashier.

The POS Version of the Product:

In one embodiment, the POS (Gas station/convenience store/lottery booth type locations) version of the fantasy sports product would require the user to fill out with pencil or pen a "bubble-type" multiple choice form to select his league, contest, entry fee, and players selected. The user would read a printed MENU (in a newspaper or a printed menu at the POS location) and then associate the contests and players listed on the menu to certain bubbles on the form. The user would submit the form with payment to the POS cashier staff (the gas station attendant, store clerk, or lottery clerk). The POS cashier staff inserts the bubble card into a lottery machine with a scanner in it which would scan the form and print out the entry ticket. The entry ticket would include:

date/timestamp of the entry
the entry fee of the entry
the dates and teams of the sports events that the entry is valid for
a unique ID # for the entry
a "name" of the contest entered (example: "Sunday $10 k NFL special")
a "league" that the contest is for (example: NHL)
an ID # of the POS location the entry was placed at
the name of the POS location the entry was placed at (example: "Joe's Lounge—Main Street")
the names and teams and positions of the fantasy players picked (example: Tom Brady—QB—NE, Antonio Brown—WR—Pit)
a barcode the POS ticket reader could read to identify the entry ID # on user return to the kiosk The POS machine may also have the ability to scan an entry ticket to determine if it was a winner or if the contest had been played yet. In the case of a winner, the POS machine would log the amount won and the POS staff member would pay out the winning amount to the customer. In the case where the contest had not been played yet the ticket would be returned to the customer to be submitted at a later date.

In both the kiosk and POS types of fantasy, large wins may require the user to go to a central lottery office to be paid, instead of being paid at the kiosk location cashier or the POS location cashier.

The invention claimed is:

1. A computer implemented method of conducting an internet-based fantasy competition contest based on performance of one or more financial markets, said method comprising:
receiving, by a server computing device, one or more requests for entry into an internet-based fantasy competition contest based on performance of one or more financial markets from one or more users, wherein said one or more requests for entry into said internet-based fantasy competition contest comprise a set of fantasy competition picks, wherein each pick of said set of fantasy competition picks is selected from a roster of financial securities, wherein each request for entry comprises a user submitting a request for entry via a user interface on a user device, said user device communicating said requests with the server computing device via the internet;
accepting, by the server computing device, said one or more requests for entry into said internet-based fantasy competition contest;
initiating, by the server computing device, said fantasy competition contest;
determining, by the server computing device, points for each user based on the set of fantasy competition picks, wherein the points are awarded based on performance of each pick; and
awarding, by the server computing device, prizes based on a ranking of users based on at least one of a total number of points or a points threshold.

2. The method of claim 1, wherein said financial securities comprise at least one of stocks, bonds, commodities, currencies, or indexes of mutual funds.

3. The method of claim 1, wherein the set of fantasy competition picks is from a selection of predetermined picks.

4. The method of claim 1, wherein said financial securities are limited by industry, cap, volume, or an exchange where the financial securities are traded.

5. A computer implemented method of conducting an internet-based fantasy competition contest, said method comprising:
receiving, by a server computing device, one or more requests for entry into an internet-based fantasy competition contest from one or more users, wherein said entry into said internet-based fantasy competition contest comprise a set of fantasy competition picks, wherein each pick of said set of fantasy competition picks is selected from one or more types of competitions, wherein each pick has a point spread value, wherein each request for entry comprises a user submitting a request for entry via a user interface on a user device, said user device communicating said requests with the server computing device via the internet;
accepting, by the server computing device, said one or more requests for entry into said fantasy competition contest;
initiating, by the server computing device, said fantasy competition contest;
determining, by the server computing device, points for each user based on the set of fantasy competition picks, wherein points are awarded based on an outcome of each pick and adjusted based on the point spread value for each pick; and
awarding, by the server computing device, prizes based on a ranking of users based on total number of adjusted points.

6. The method of claim 5, wherein the point spread value for each pick of said set of fantasy competition picks is a negative value, positive value, or zero.

* * * * *